July 31, 1956     A. N. COOK     2,756,761
THERMOSTATICALLY OPERATED CONTROL DEVICE
Filed Dec. 12, 1952
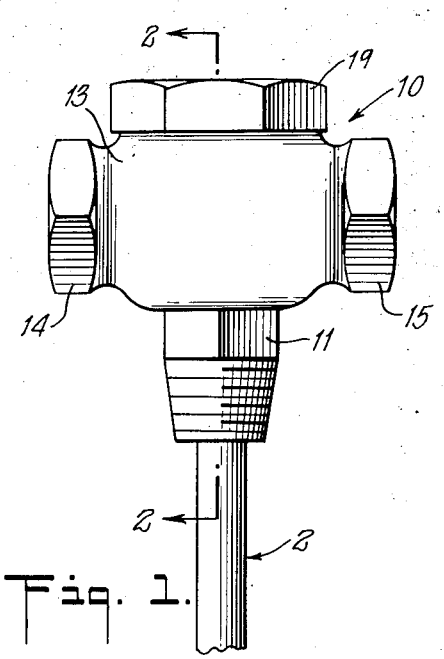
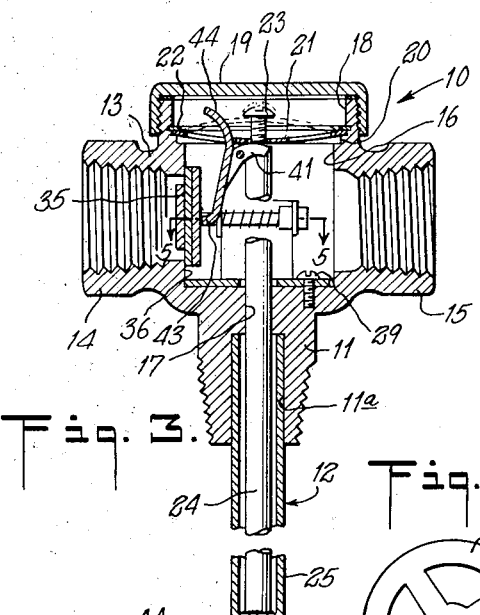
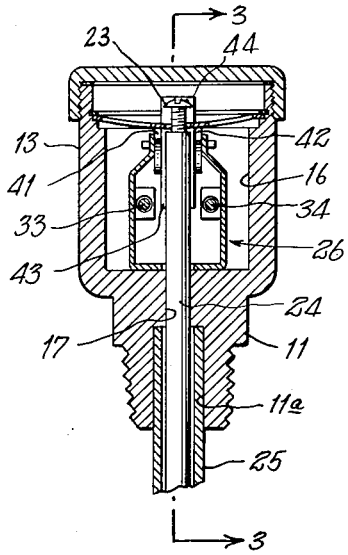
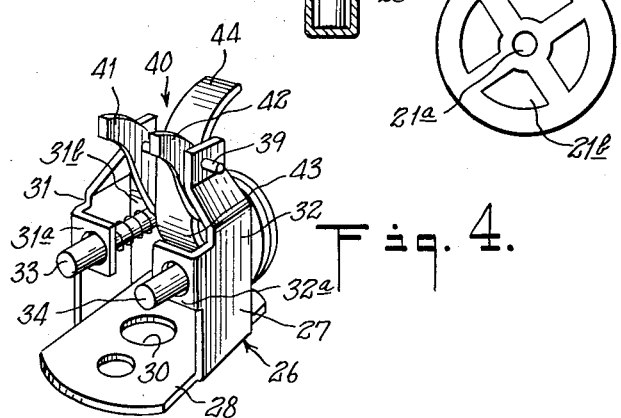
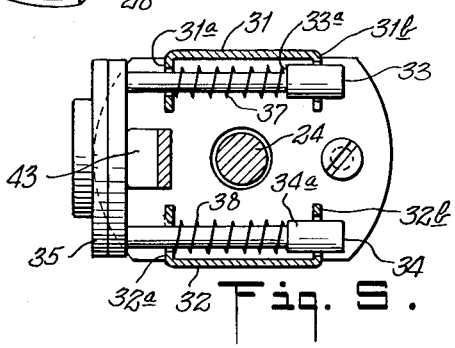
INVENTOR.
ALBERT N. COOK
BY
Campbell, Brumbaugh, Free & Graves
ATTORNEYS _United States Patent Office_

2,756,761
Patented July 31, 1956

---

2,756,761

THERMOSTATICALLY OPERATED CONTROL DEVICE

Albert N. Cook, Bernardsville, N. J., assignor to John B. Pierce Foundation, New York, N. Y., a corporation of New York Application December 12, 1952, Serial No. 325,550

7 Claims. (Cl. 137—79)

This invention relates to thermostatically operated control devices, and more particularly to devices of this nature which are capable, for example, of operating shut-off valves in illuminating gas conduits.

Good safety practice in the use of illuminating gas as a fuel in heaters, furnaces and the like requires that the gas supply be shut off automatically in emergencies. Safety equipment of this type must be fool proof in its operation and, if it is to find wide acceptance for domestic systems, must be robust in its design but simple and inexpensive to manufacture.

It is one object of this invention to provide an improved thermostatically operated control device.

Another object of the invention is to provide a thermostatically operated control device capable of operation as a shut-off valve in a gas conduit.

Yet another object of the invention is to provide an improved thermostatically controlled gas valve which is simple in construction, positive in its action and inexpensive to build.

These and other features and objects of the invention may be attained by providing a thermostatically operated control device utilizing a snap spring member having two configurations of equilibrium between which it will snap forcefully and rapidly under an initiating movement of relatively small magnitude. The device may include a temperature responsive element and a work output element such as a gas valve assembly, for example, controlled thereby. Disposed between these elements is an actuating linkage including the snap spring member. The actuating linkage, which may be integrated with the gas valve as an assembly, may include lever means having one portion which reacts with the snap spring member and another portion which reacts with the gas valve.

So that the snap spring member may be returned to its initial configuration, the lever means may be formed with an extension portion in the form of a handle which may be manually actuated to swing the lever means in a reverse direction causing the snap spring member to reverse its configuration and permitting the gas valve to open. The snap spring member may be arranged in adjustable relation to the temperature responsive element that snap action is initiated after a preestablished temperature is reached.

For a better understanding of the invention reference may be had to the accompanying drawing in which:

Fig. 1 is a side view of the exterior of a thermostatically operated control device formed in accordance with the present invention;

Fig. 2 is a view in vertical section taken on the line 2—2 of Fig. 1 looking in the direction of the arrows;

Fig. 3 is a view in vertical section turned 90 degrees from that of Fig. 2, and taken on the line 3—3 of Fig. 2 looking in the direction of the arrows;

Fig. 4 is a view in perspective of the valve and its actuating assembly lifted from the housing;

Fig. 5 is a view in horizontal section taken on the line 5—5 of Fig. 3 looking in the direction of the arrows; and Fig. 6 is a plan view of a snap spring member used in the device of this invention.

Referring to the drawing the invention is shown for purposes of illustration as being embodied in a unified device 10 for controlling gas flow and including a threaded base portion 11, an outwardly extending temperature responsive or thermostatic element 12 adapted to be received in a boiler, for example, and an outer housing portion 13. The outer housing portion 13 is formed on either end with internally threaded fittings 14 and 15 into which a gas conduit may be threaded and which communicate with opposite sides of a central cavity 16. The lower end of the cavity 16 communicates through a bore 17 in the base portion 11 with the temperature responsive element 12 and the upper end with an enlarged cylindrical opening 18 covered by removable cap 19. When assembled with the cap 19 in place, the unit 10 is gas-tight.

Seated by its periphery on an annular shelf 20 near the base of the cylindrical opening 18 is a snap spring member 21 held in place by a ring clip 22. As best seen in Fig. 6, the snap spring member 21 may be in the form of a multi-legged disc having a central aperture 21a and a plurality of angularly arrayed apertures 21b defined by the leg portions. Such snap spring members, which are well-known in the art, are formed of pre-stressed metal and are adapted to snap between two dished configurations of equilibrium, once snapping motion is initiated by input movement of relatively small magnitude. In the case of snap spring members of double equilibrium the reversed configuration will be maintained until force is applied to cause it to snap into its original configuration.

The central aperture 21a of the snap spring member 21 loosely receives an adjustable screw 23 which is threaded into the free end of a rod 24, which comprises an element of the temperature responsive means 12. The rod 24 passes through the cavity 16 and out of the housing through the bore 17 and through an enlarged bore 11a formed in the base portion 11. The outer end of the rod 24 is affixed as by welding to the closed outer end of a sleeve 25, the inner end of which is anchored in a gas-tight fit in the bore 11a. The rod 24 is preferably formed of a material having a relatively low coefficient of thermal expansion, whereas the sleeve 25 is formed of a material having a relatively high thermal coefficient of expansion. Thus when the temperature responsive element 12 is subjected to heating, the sleeve 25 will expand faster than the rod 24, resulting in axial movement of the inner end of the rod 24 downwardly, causing the head of the screw 23 to pull the center portion of the snap spring member 21 downwardly to initiate snap movement from the configuration of equilibrium as shown in broken lines to that shown in full lines in Fig. 3. The trip point of the snap member may be adjusted by turning the screw 23 to raise or lower the head of the screw relatively to the end of the rod 24.

Disposed in the cavity 16 beneath the snap spring member 21 is an actuating linkage and valve assembly 26 including, as best seen in Figs. 4 and 5, a U-shaped bracket 27 the base portion 28 of which is attached as by a mounting screw 29, for example, to the base of the cavity 16. The base 28 of the bracket 27 is formed with a central aperture 30 which is in register with the bore 17 and through which the rod 24 of the thermostat element 12 may pass to reach the snap spring member 21. The bracket 27 includes a pair of laterally spaced upstanding arms 31 and 32 formed between their ends with inturned, apertured lugs 31a and 31b and 32a and 32b, respectively, which slidably receive a pair of parallel guide pins 33 and 34 which support a valve 35 for sliding movement away from and toward a valve seat 36 at the left-hand side of the cavity 16, as viewed in Fig. 3. The guide pins 33 and 34 are formed near their free ends with shoulders 33a and 34a, respectively, and compressed between these shoulders and the mounting lugs 31a and 32a are springs 37 and 38, respectively, which urge the valve 35 away from its valve seat. The clearances of the slidable mounting for the valve 35 are made sufficiently generous so that the valve will be self-aligning on its seat 36.

Pivotally mounted on a pin 39 carried by the upstanding arms 31 and 32 near their upper ends is an actuating lever assembly 40 including a pair of laterally spaced apart lever arms 41 and 42 and a depending tongue portion 43. The upper ends of the lever arms 41 and 42 underlie the center portion of the snap spring member 21 within its range of snap movement and the lower end of the tongue 43 is arranged to engage the back of the valve 35. The lever assembly 40 is also formed with an upstanding reset arm 44 which extends upwardly through one of the apertures 21b in the legged snap spring member 21 into the cylindrical area 18 so as to be accessible for manipulation when the cap 19 is removed. The lever assembly 40 may be formed from a single piece of sheet metal.

In operation it will be assumed that the unit 10 is installed in a boiler wall by means of the base portion 11 with the temperature responsive element 12 extending into the boiler to be enveloped by the boiler water and with the gas conduit (not shown), which leads to the burner of the boiler, connected to the fittings 14 and 15. With the snap spring member 21 disposed in its configuration as shown in broken lines in Fig. 3, the valve 35 will be opened due to the action of the springs 37 and 38 and due to the fact that the lever assembly 40 will be swung in a counter-clockwise direction about the pin 39 as viewed in Fig. 3. The trip point of the unit having been previously set by adjustment of the screw 23 axially of the rod 24, overheating in the boiler will cause the rod 24 to pull downwardly causing the snap spring member 21 to snap forcefully to its configuration shown in full lines in Fig. 3. In reversing its configuration, the snap spring member 21 will engage the upper ends of the lever arms 41 and 42 and will swing the lever assembly 40 in a clockwise direction about the pivot 39 forcing the valve 35 against its seat 36 to terminate the gas flow to the burner. Lost motion is provided in the connection between the upper end of the rod 24 and the snap spring member 21 to permit the snap spring member to assume its second configuration. Preferably the valve 35 will seat before the snap spring member 21 attains its natural configuration of equilibrium so that the system will become static with a considerable spring force from the snap spring member reacting against the closed valve.

After the snap spring member has been tripped and the gas valve closed, resetting may be effected by removing the cap 19 and manipulating the reset arm 44 to cause the lever assembly 40 to swing in a counter-clockwise direction about its pivot 39. This manipulation may if desired be effected through a flexible diaphragm across the opening to prevent the escaping of gas or, alternatively, supplementary shut off valves may be provided in the conduit. Swinging of the lever assembly 40 in a counter-clockwise direction as shown in Fig. 3 causes the snap spring member 21 to be snapped into its initial configuration, thereby freeing the valve 35 so that the springs 37 and 38 will cause it to unseat to open the gas path through the conduit.

The particular form of the invention here described and illustrated in the accompanying drawing is presented as an example of how the invention may be applied. Other forms, embodiments and applications of the invention coming within the proper scope of the appended claims will readily suggest themselves to those skilled in the art.

I claim:

1. In a control device, a work member movable between first and second positions, abutment means defining the first position of the work member, a snap spring member adapted to snap between first and second configurations of equilibrium on either side of a center, means for initiating snap movement of said member between configurations, and operative driving connections interposed between the work member and the snap spring member including a lever having a first portion interposed in the path of movement of the snap spring member, and a second portion adapted to react against the work member to urge the latter toward the first of its positions, said abutment means, work member and lever being positioned relatively to said snap spring member to terminate snap movement of the latter between the center and the first configuration of equilibrium, whereby the snap spring member resiliently holds the work member in its first position against the abutment means.

2. In a control device as set forth in claim 1 said lever having a third portion including an extension arm for actuating the lever to return the snap spring member to its first configuration.

3. In a control device, a housing adapted to be connected to an external conduit for a fluid medium, a valve seat in the housing, a valve slidably mounted in the housing to engage said seat, resilient means urging said valve away from its seat, a snap spring member adapted to snap between first and second configurations of equilibrium across a center position, thermoresponsive means for initiating snap movement of said member from its first toward its second configuration, and operative driving connections interposed between the snap spring member and the slide valve including a lever pivotally mounted in said housing and having one portion interposed in the path of snap movement of the snap spring member and having another portion adapted to engage said slide valve to urge the latter against its seat, said valve seat, valve and lever terminating the snap movement of the snap spring member before its second configuration is reached and after the center position is crossed, whereby the spring force of the snap spring member acts to hold the valve against its seat.

4. In a control device, a housing adapted to be connected to an external conduit for a fluid medium, a valve seat in the housing, a valve slidably mounted in the housing to engage said seat, resilient means urging said valve away from its seat, a snap spring member adapted to snap between first and second configurations of equilibrium, thermoresponsive means for initiating snap movement of said member from its first toward its second configuration across a center position, and operative driving connections interposed between the snap spring member and the slide valve including a lever pivotally mounted in said housing and having a first portion interposed in the path of snap movement of the snap spring member, a second portion adapted to engage said slide valve to urge the latter against its seat, the valve seat, valve and lever terminating the snap movement of the snap spring member between the second configuration of equilibrium and the center position whereby the spring force of the snap spring member holds the valve in its closed position, and a third portion formed integrally with the first and second portions for pivoting the lever to cause said snap spring member to be snapped to the first configuration and to permit said resilient means to unseat the valve.

5. In a control device, a housing having a cavity formed therein, means for connecting the housing to an external conduit for a fluid medium, a bracket mounted in the cavity including upstanding arm portions, a valve seat in the housing, a valve for engaging said seat to terminate the flow in the conduit, guide pin means attached to the valve and slidably journalled in said upstanding arm portions to permit the valve to be moved between positions against and spaced from the seat, resilient means reacting between said bracket and said valve for urging the latter toward one of its positions, an apertured snap spring member mounted in the housing adjacent said opening and near one side of the bracket to partake of the snap movement between two configurations of equilibrium, thermoresponsive means on the opposite side of the bracket including a rod movable to initiate snap movement of the snap spring member from one configuration to another, said rod passing through the cavity between the arm portions of the bracket to connect to the snap spring member, a lever pivotally mounted between the upstanding arm portions of the bracket and including laterally spaced arms on one side of the pivot embracing the rod and interposed in the path of snap movement of said member, said lever including a second portion on the opposite side of the pivot from the laterally spaced arms adapted to engage the valve to force the latter toward a second position, and a resetting extension formed integrally with said lever means and extending through an aperture in said snap spring member.

6. In a control device, a housing having a cavity formed therein, means for connecting the housing to an external conduit for a fluid medium, a bracket mounted in the cavity including a pair of upstanding arm portions, a valve seat in the housing, a valve for engaging said seat to terminate the flow of the fluid medium through the conduit, guide pin means for said valve, bearing means formed on said upstanding arm portions for the guide pin means whereby the valve may be moved between positions against and spaced from the seat, resilient means reacting between said bracket and said valve for unseating the valve, a snap spring member mounted in the housing to partake of the snap movement between two configurations of equilibrium, thermoresponsive means carried by the housing to provide a motion for initiating snap movement of the snap spring member, means connecting said thermoresponsive means to said snap spring member to initiate snap movement thereof from one configuration to another, lever means pivotally mounted intermediate its ends between the upstanding arm portions of the bracket, said lever means including one portion interposed in the path of snap movement of the snap spring member and another portion adapted to engage the valve to force the latter against its seat, a resetting extension portion formed integrally with said lever means, and means affording access to said resetting extension portion whereby the member may be snapped into initial configuration.

7. In a control device, a housing having a cavity formed therein, means for connecting the housing to an external conduit for a fluid medium, a bracket mounted in said cavity including a pair of upstanding arm portions, a valve seat in the housing, a valve for engaging said seat to terminate the flow of the fluid medium in the conduit, a pair of guide pins for said valve, bearing means carried by said upstanding arms in which said guide pins are slidably mounted whereby the valve may be moved between positions against and spaced from the seat, resilient means reacting between said bracket and said valve for unseating the valve, an apertured snap spring member mounted in the housing adjacent said opening to partake of the snap movement between two configurations of equilibrium, thermoresponsive means carried by the housing to provide a motion for initiating snap movement of the snap spring member and including a rod connected to the snap spring member, said rod extending through the cavity between the upstanding arm portions and between the guide pins of the valve, lever means pivotally mounted intermediate its ends between the free ends of the upstanding arm portions of the bracket, said lever means including at one end a pair of lever arms interposed in the path of snap movement of the snap spring member and embracing the rod, a tongue portion at the other end of the lever adapted to react against the valve to force the latter against its seat, a resetting extension portion carried by said lever means and extending through an aperture in said snap spring member, means forming an opening in the housing adjacent the resetting extension portion, and a detachable cap portion for the opening whereby when the cap portion is removed, the member may be snapped into initial configuration by means of said extension portion.

References Cited in the file of this patent

UNITED STATES PATENTS

| | | |
|---|---|---|
| 2,214,375 | Jackson | Sept. 10, 1940 |
| 2,238,837 | Vaughn | Apr. 15, 1941 |
| 2,276,014 | Bondurant | Mar. 10, 1942 |